July 4, 1950 J. J. GREVICH 2,513,475
FISHING ROD HOLDER

Filed July 1, 1948 2 Sheets-Sheet 1

Inventor
John J. Grevich
By Robert M. Dunning

July 4, 1950         J. J. GREVICH         2,513,475
FISHING ROD HOLDER
Filed July 1, 1948                    2 Sheets-Sheet 2
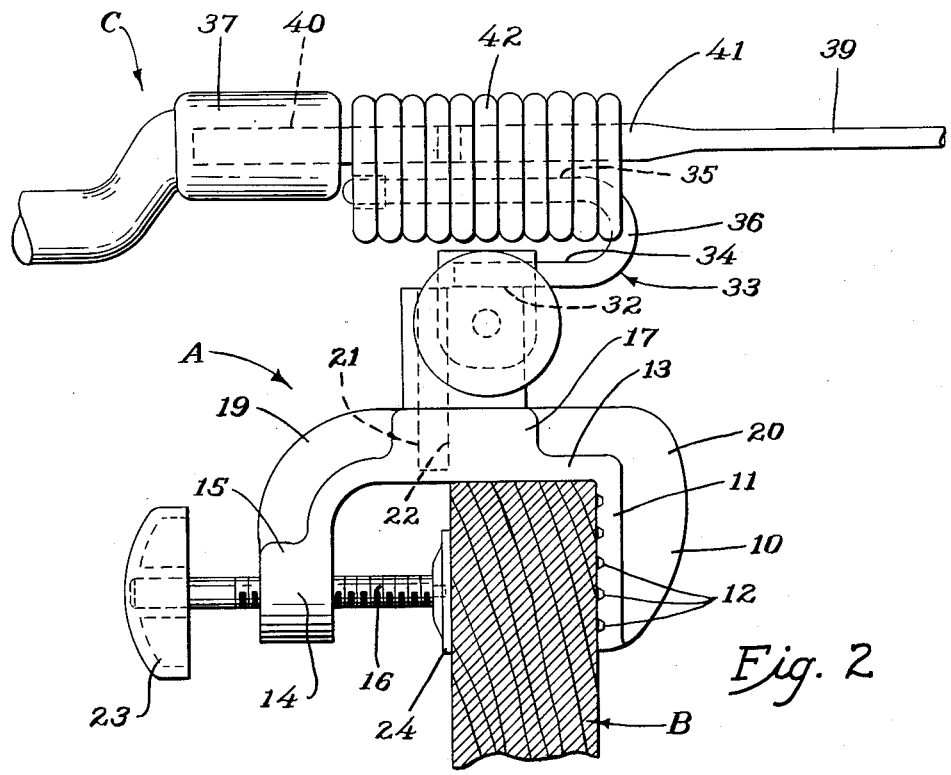
Fig. 2
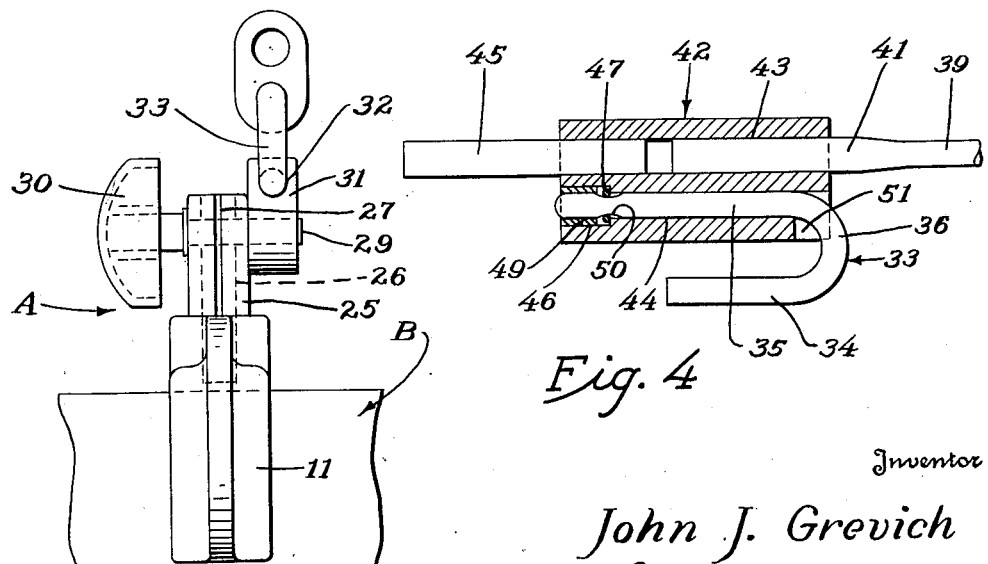
Fig. 3
Fig. 4
Inventor
John J. Grevich
By Robert M. Dunning Patented July 4, 1950

2,513,475

UNITED STATES PATENT OFFICE 2,513,475

FISHING ROD HOLDER

John J. Grevich, St. Paul, Minn.

Application July 1, 1948, Serial No. 36,501

10 Claims. (Cl. 248—42)

My invention relates to an improvement in fishing rod holder wherein it is desired to provide a device for holding a fishing rod in fixed position.

In fishing from a row boat or motor boat, it is often times inconvenient to hold the fishing rod in the hands throughout the entire period of fishing. For example when operating an outboard motor or rowing the boat, it is difficult to hold the fishing rod at the same time. Trouble is experienced in securely holding the fish pole when it can not be held in the hands. Laying the pole in the bottom of the boat, or resting it against the side of the boat is dangerous as a sudden motion of the boat or a strong pull upon the fish line is apt to pull the pole over the edge of the boat and into the water.

The object of the present invention lies in the provision of a means detachably connected to a boat in any suitable position which may detachably support a fishing pole. The pole is held at any desired angle and extending in any desired direction. If a sudden pull is exerted upon the line, it is possible for the line to be unwound from the reel, but the pole remains in set position. At the same time the pole may be released from the support at any time by proper movement of the pole relative to the support.

A feature of the present invention lies in the provision of an attachment for the fishing pole which may be used on virtually any type of pole. This attachment may be either clamped on the shaft near the handle end thereof or may be interposed between a pair of telescoping parts so as to form a part of the pole and to elongate the pole slightly. This attachment is cooperable with a bracket which may be clamped in any desired position to the edge of the boat.

A feature of the present invention lies in the provision of a pole support which includes an attachment on the pole having an elongated socket therein removably engageable with a fixed bracket on the boat. The pole may be attached to the bracket by moving the pole longitudinally of the bracket to engage the bracket in the elongated socket.

A feature of the present invention lies in the provision of a clamp which adjustably supports a U-shaped mounting arm which may be supported in any desired angular relation to the edge of the boat. This mounting arm is designed to extend into a longitudinally extending aperture on the pole attachment so that the pole is detachable from the arm by an inward movement of the pole. Thus an outward pull upon the pole or supporting line can not accidentally disengage the pole from its bracket.

These and other objects and novel features of my invention will be more clearly and fully set forth in the following specification and claims.

In the drawings forming a part of my specification:

Figure 2 is a side elevational view of the holder in use.

Figure 3 is an end elevation view of the device.

Figure 4 is a sectional view through a portion of the holder showing the construction thereof.

Figure 5 is a side elevational view of a different type of fish pole attachment which may be used.

Figure 6 is an end elevational view of the fish pole attachment illustrated in Figure 5.

Figure 1:
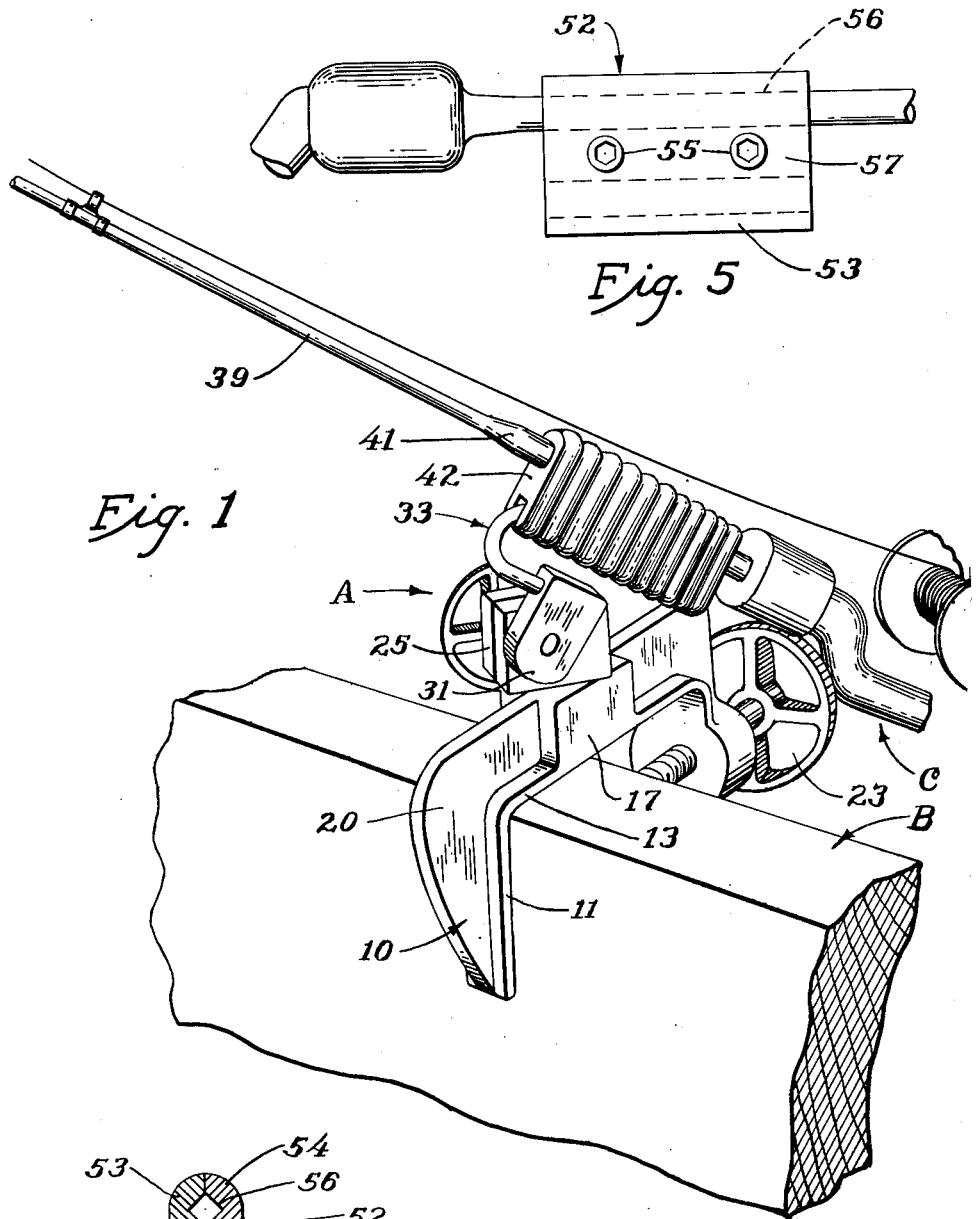
Figure 1 is a perspective view of my device showing the construction thereof.

The fishing rod holder A includes a generally U-shaped clamping bracket 10 designed to extend over the edge of a boat B. The bracket 10 includes a downwardly extending flange 11 designed to extend over the outer surface of the boat wall and preferably having grooves 12 on its inner surface to engage the boat more securely. The top flange 13 of the bracket 10 extends over the upper surface of the boat edge and is of sufficient length to accommodate boats having thick walls. The inner side 14 of the bracket is generally parallel to the outer wall 11 and includes a thickened boss 15 through which a threaded clamping screw 16 extends. The wall of the bracket is also thickened at 17 at its upper extremity and strengthening ribs 19 and 20 are provided connecting the boss 15 with the thickened area 17 and extending from the thickened area 17 to the outer extremity of the flange 11. An aperture or socket 21 is provided in the thickened area 17 to accommodate a pivot pin 22 which projects upwardly from the clamping bracket 10 and which is anchored to the clamping bracket. The clamping screw 16 is provided with a handle 23 on its inner end by means of which the screw may be rotated and a clamping plate 24 is pivoted to the outer end of the screw for engagement against the inner surface of the side wall of the boat B.

A pivot block 25 is provided with a vertical aperture 26 therethrough for accommodation of the upwardly projecting end of the pivot pin 25. The pivot block 25 is vertically split at 27 between the aperture 26 and the outer edge of the block. A clamping screw 29 extends through the split portions of the clamping block. A handle 30 is mounted on one end of the clamping bolt 29 by means of which the clamping bolt may be rotated. A mounting block 31 is threaded to accommodate the end of the clamping bolt 29. When the clamping bolt is tightened the mounting block 31 is clamped against one side of the pivot block 25 while the handle 30 engages against the opposite side thereof so as to clamp the pivot block together and to hold the block from turning on the vertical pivot 22. When the clamping bolt 29 is loosened the pivot block 25 may rotate freely about the pivot pin 22.

The angularity between the pivot block 25 and the mounting block 31 may also be regulated when the clamping bolt 29 is loosened and when this screw is tightened the mounting block 31 is held in fixed relation to the block 25.

The mounting block 31 is provided with an aperture 32 therein. A generally U-shaped mounting arm 33 is frictionally engaged in the aperture or socket 32. This mounting arm 33 includes a pair of parallel arm portions 34 and 35 connected by a rounded connecting end 36. The arm 34 is securely anchored in the socket 32 and the rounded end 36 is so arranged that the arm 35 normally extends above the arm 34 and in the same vertical plane.

The fishing pole C usually includes a handle portion 37 and a shaft 39 designed to project therefrom. The handle 37 is usually provided with an elongated socket 40 therein for accommodation of the end 41 of the pole, the pole end 41 frictionally engaging in the socket 40 so that the handle and shaft may be detachably connected. I provide an attachment 42 which may be interposed between the handle 37 and the shaft 39. This attachment 42 includes an elongated body having a pair of longitudinally extending apertures 43 and 44 extending therethrough. One end of the aperture 43 forms a socket end removably supporting the end 41 of the pole shaft 39. An extension pin 45 projects from the other end of the aperture 43 and is anchored to the attachment body to form a permanent part thereof. This extension 45 is designed to extend into the handle socket 40 so that the attachment in reality elongates the rod slightly by forming the telescoping part which fits into the rod adjacent the handle.

The aperture 44 is enlarged at one end as indicated at 46 and accommodates a spring ring 47. This spring ring 47 is held in place by a sleeve 49 which is pressed into the enlarged diameter aperture 46. Thus the spring ring 47 is locked from axial movement within the aperture 44. The inner diameter of the sleeve 49 as well as the remainder of the aperture 44 is of proper diameter to snugly accommodate the end 35 of the mounting arm 33. The end 35 of the mounting arm 33 is provided with a peripheral groove 50 therein near the extremity of the arm. A notch 51 is provided in the attachment communicating with the aperture 44. The rounded end 36 of the mounting arm is designed to extend into this notch 51 when the attachment 42 is mounted thereon so as to hold the attachment from rotation about the axis of the arm portion 35. Furthermore when the arm portion 35 is engaged in the aperture 44, the spring ring 47 engages in the groove 50 to hold the pole attachment from longitudinal movement relative to the mounting arm 33. However, when it is desired to remove the pole from its support, a pull upon the pole handle will cause the spring ring 47 to expand sufficiently to allow disengagement of the attachment 42 from the mounting arm 33.

The operation of my apparatus is believed obvious from the description. The attachment 42 is mounted on the fishing pole C in the manner described to form a part thereof. This attachment 42 remains in place upon the pole during the use of the pole. When it is desired to support the pole with the holder, the holder is clamped in desired position to the edge of the boat and the arm portion 35 of the mounting arm is engaged in the aperture 44. By loosening the clamping screw 29 the pole may be adjusted to any desired angle and any desired direction. By merely tightening the handle 30 the holder will remain in adjusted position.

As the end 35 of the mounting arm is engaged into the socket or aperture 44, the end of this arm engages into the spring ring 47, expanding the ring until the ring moves into engagement with the groove 50. The spring ring then resists disengagement of the mounting arm 33 from the attachment socket 44. The engagement of the rounded portion 36 of the mounting arm with the notch 51 holds the attachment 42 erect and prevents relative pivoting of this attachment about the axis of the arm portion 35.

In Figures 5 and 6 of the drawings I disclose a modified form of construction for use with poles of somewhat different construction from that described. The attachment 52 illustrated in these figures comprises an elongated body formed in two cooperable parts which may be clamped about a fish pole in desired position adjacent the handle end thereof. The attachment 52 includes two generally similar sides 53 and 54 which are held together by clamping screws 55. Two elongated sockets or apertures 56 and 57 extend in parallel relation through the attachment 52 at the point of juncture between the cooperable sides. The aperture 52 may if desired be rectangular in shape to firmly grip the shaft of a fish pole. The other socket 57 is designed to accommodate the arm portion 35 of the mounting arm 33. The remaining structure of the device is similar to that previously described.

Obviously the attachment 52 may be clamped about the shaft of any fish pole near the handle end thereof and will form a part of the pole in use. When it is desired to support the pole the mounting arm 33 is engaged in the socket 57 which is virtually identical with the previously described socket 44 of the attachment 42.

In accordance with the patent statutes, I have described the principles of construction and operation of my fishing rod holder, and while I have endeavored to set forth the best embodiment thereof, I desire to have it understood that obvious changes may be made within the scope of the following claims without departing from the spirit of my invention.

I claim:

1. A fishing pole support including an attachment secured to the fish pole, an elongated socket in said attachment substantially parallel to the supporting pole with the entrance end of the socket directed away from the handle end of the pole, a bracket designed for attachment to the edge of a boat, a mounting arm on said bracket, said mounting arm being slidably engageable in said elongated socket.

2. A fishing pole device for use in combination with a fish pole having a shaft and a socketed handle therefor, the device including an elongated body having a socket in one end and a projection on the opposite end, said projection being designed for engagement into the handle of a fishing pole, and the socket being designed for accommodation of the shaft of the fishing pole, a second socket in said elongated body, and a bracket having an arm slidably detachably engageable into said socket.

3. A fishing pole device for use in combination with a fish pole having a shaft and a socketed handle therefor, the device including an elongated body having a socket in one end and an aligned projection on the other end thereof, said projection being engageable into the handle of the fishing pole and the socket being engageable with the shaft of the fishing pole, a second elongated socket in said body, and an adjustable bracket having a mounting arm engageable into said socket.

4. A fishing pole holder including a clamp designed to accommodate the edge of a boat, a substantially vertical pivot pin on said clamp, a split pivot block pivotally supported on said pivot, a mounting block adjustably and pivotally connected to said pivot block, a pivot bolt connecting said pivot blocks and operable to hold both blocks in adjusted position, and detachable connecting means between said mounting block and the fishing pole.

5. A fishing pole holder including a mounting bracket, a mounting arm adjustably supported by said bracket, a fishing pole attachment including an elongated body secured to the pole, and having an elongated socket therein, said socket being slidably engageable with said mounting arm.

6. The structure described in claim 5 and including means cooperable between said attachment and said mounting arm to prevent pivotal movement of said attachment about said arm.

7. The structure described in claim 5 in which the mounting arm is bent and the attachment is provided with a notch communicating with the socket at one end thereof into which the bent portion of the arm may extend to prevent relative rotation between the arm and the attachment.

8. The structure described in claim 5 and including resilient means cooperable between said attachment and said arm for holding said arm engaged in said socket.

9. A fishing pole holder including a mounting bracket, a mounting arm adjustably supported by said bracket, a fishing pole attachment including an elongated body secured to the pole, and having an elongated socket therein, said socket being slidably engageable with said mounting arm, said mounting arm being U-shaped in form and having two substantially parallel ends, one of which is supported by the bracket and the other of which is slidably engageable in said socket.

10. The construction described in claim 9 and in which said body is provided with a notch communicating with one end of said socket engageable with the curved end of the bracket to prevent rotative movement of said attachment about said arm.

JOHN J. GREVICH.

REFERENCES CITED

The following references are of record in the file of this patent:

UNITED STATES PATENTS

| Number | Name | Date |
|---|---|---|
| 840,241 | Nootbaar | Jan. 1, 1907 |
| 1,184,583 | Danko | Dec. 26, 1939 |
| 2,416,828 | Hamre | Mar. 4, 1947 |